(12) United States Patent
Bengtsson et al.

(10) Patent No.: US 11,547,905 B2
(45) Date of Patent: Jan. 10, 2023

(54) TIME-OF-FLIGHT RANGING DEVICE

(71) Applicant: SONY CORPORATION, Tokyo (JP)

(72) Inventors: Henrik Bengtsson, Lund (SE); Anders Linge, Lund (SE); Johan Nyman, Lund (SE)

(73) Assignee: Sony Group Corporation, Tokyo (JP)

( * ) Notice: Subject to any disclaimer, the term of this patent is extended or adjusted under 35 U.S.C. 154(b) by 264 days.

(21) Appl. No.: 16/768,656

(22) PCT Filed: Dec. 12, 2018

(86) PCT No.: PCT/SE2018/051305
§ 371 (c)(1),
(2) Date: May 30, 2020

(87) PCT Pub. No.: WO2019/147175
PCT Pub. Date: Aug. 1, 2019

(65) Prior Publication Data
US 2020/0398113 A1 Dec. 24, 2020

(30) Foreign Application Priority Data
Jan. 24, 2018 (SE) .................................. 1850081-9

(51) Int. Cl.
*A63B 24/00* (2006.01)
*A63B 21/062* (2006.01)
(Continued)

(52) U.S. Cl.
CPC ...... *A63B 24/0062* (2013.01); *A63B 21/0628* (2015.10); *G01S 7/4813* (2013.01);
(Continued)

(58) Field of Classification Search
None
See application file for complete search history.

(56) References Cited

U.S. PATENT DOCUMENTS

| 7,511,800 | B2 | 3/2009 | Lewis | |
| 2014/0049766 | A1* | 2/2014 | Hudman | ............ G02B 27/0927 356/5.01 |

(Continued)

FOREIGN PATENT DOCUMENTS

| EP | 1013312 A2 | 6/2000 |
| WO | 9320458 A2 | 10/1993 |

(Continued)

OTHER PUBLICATIONS

European Office Action from corresponding European Application No. 18827283.5, dated Nov. 24, 2021, 4 pages.

(Continued)

*Primary Examiner* — Jason T Yen
(74) *Attorney, Agent, or Firm* — Tucker Ellis LLP (57) ABSTRACT

A housing for a Time-of-Flight (ToF) range meter includes a wall structure defining a first optical beam path to an emitter of the ToF range meter, and a second optical beam path to a detector of the ToF range meter, and a transmissive optical diffusor configured to cover the beam path to at least one of said emitter and said detector. The housing may be connected to a ToF range meter into a ToF ranging device. Such a ToF ranging device where the ToF ranging device is directed to measure a distance to a reflector member to determine a distance which correlates to the weight of the selectively engaged weights.

17 Claims, 4 Drawing Sheets (51) Int. Cl.
*G01S 7/481* (2006.01)
*G01S 17/08* (2006.01)

(52) U.S. Cl.
CPC ........... *G01S 17/08* (2013.01); *A63B 2220/20* (2013.01); *A63B 2220/805* (2013.01); *A63B 2220/833* (2013.01)

(56) References Cited

U.S. PATENT DOCUMENTS

| | | |
|---|---|---|
| 2014/0231635 A1 | 8/2014 | Kerness et al. |
| 2016/0047904 A1 | 2/2016 | Mellot |
| 2016/0293585 A1 | 10/2016 | Geiger |
| 2017/0038459 A1* | 2/2017 | Kubacki ................ G01J 1/0425 |
| 2017/0299861 A1* | 10/2017 | Wierich ................. G06F 3/013 |
| 2018/0006182 A1 | 1/2018 | Renard et al. |
| 2018/0011490 A1 | 1/2018 | You et al. |
| 2019/0160335 A1* | 5/2019 | Bengtsson ......... A63B 24/0062 |

FOREIGN PATENT DOCUMENTS

| | | |
|---|---|---|
| WO | 2013127975 A1 | 9/2013 |
| WO | 2016195592 A1 | 12/2016 |
| WO | 2017178048 A1 | 10/2017 |

OTHER PUBLICATIONS

International Search Report and Written Opinion from corresponding International Application No. PCT/SE2018/051305, dated Mar. 28, 2019, 10 pages.

Swedish Search Report from corresponding Swedish Application No. 1850081-9, dated Sep. 5, 2018, 4 pages.

* cited by examiner

TIME-OF-FLIGHT RANGING DEVICE

TECHNICAL FIELD

The invention relates generally to a configuration of an electro-optical device configured to provide an output based on measurement of time-of-flight, which may be correlated to a measured distance, referred to herein as a time-of-flight ranging device or range meter. Specifically, a housing is provided for use in connection with a time-of-flight range meter. The invention further relates a measurement system for an exercise machine comprising a lifting mechanism for selectively engaging a number of weights, incorporating such a device.

BACKGROUND

A Time-of-Flight (ToF) range meter is configured to provide a distance measurement based on measuring the time-of-flight of a light signal between an emitter and detection of reflected emitted light, using the known speed of light. Normally, a ToF range meter includes a chipset comprising both a light emitter and a light detector, and a circuit for measuring time between emission and detection of received light, reflected from a ranged target. ToF range meters are typically employed as distance meters in cameras, and for assisting autofocus mechanisms.

Figure 1:
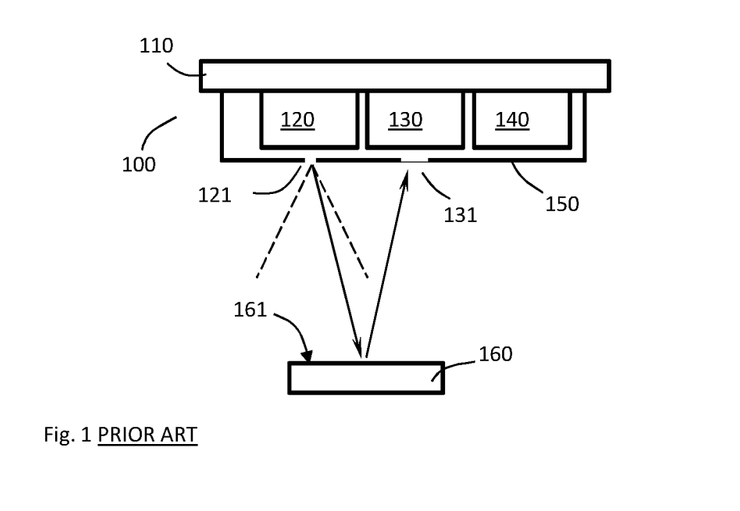
FIG. 1 schematically illustrates an exemplary state of the art ToF range meter.

FIG. 1 schematically illustrates a typical state of the art ToF range meter 100. It should be noted that the ToF range meter 100 is primarily arranged to measure time but may be additionally be configured to calculate and output a distance measurement based on the measured time. In alternative embodiments, a ToF range meter may simply output a time value, which may be further processed or used, e.g. for calculating a distance, in other devices. The ToF range meter 100 may include an electromagnetic emitter 120, configured to emit an electromagnetic signal wave through an opening 121 within an angle, e.g. a cone angle, as indicated by the dashed lines. Upon reflection at a surface 161 of a reflector member 160, at least a portion of the emitted signal is directed back towards the ToF range meter 100, where it is received through an opening 131 and sensed in a detector 130. The detector 130 is preferably configured with a field of view corresponding to or at least overlapping the emission angle of the emitter 120. A control unit 140 preferably includes a measurement circuit configured to measure time and optionally recalculate it to distance to the point of reflection 161 dependent on the emitted signal and the reflected signal. In the ToF range meter 100, the emitter 120 may typically be a light emitter configured to emit a periodic signal, e.g. a near infrared (NIR) signal. The detector 130 may comprise a light-sensitive detector such as a single-photon avalanche diode (SPAD), and typically a plurality of adjacent SPADs forming a detector or sensor array. The emitter 120 and the detector 130 are preferably provided on a common carrier 110, such as a PCB, such that they are reliably interconnected and commonly aligned. A ToF range meter or sensor 100 may e.g. operate according to the principles disclosed in US2016/0047904, the content of which is incorporated herein by reference. That disclosure provides a method for measuring a distance by measuring phase of a series of bursts of pulses relative to a periodic generator signal.

A problem identified in the art of ToF range meters is related to stability and repeatability of measurement results. For state of the art compact ToF range meters, which are configured to be used in e.g. mobile phones and portable camera devices, the distance measuring accuracy may be in the area of 5% at indoor conditions, when measuring against a white surface up to 2 m away from the sensor. This may oftentimes be sufficient for various fields of use. However, such ToF range meters are generally optimized to be used with a diffuse flat large target. When measuring against other types of targets, such as a relatively small surface with high reflectance, it has been noted that the measurement results may drift over time. With a maintained level of accuracy between successive repetitions, and the added deviation due to sensor drift, the overall accuracy may for certain use cases be unsatisfactory.

SUMMARY

An overall objective is thus to provide a ToF ranging device configured to provide consistent distance measurement results over time. An aspect of this objective is to improve the measurement consistency of a ToF ranging device when used together with a small high reflective target. A further objective is to provide a solution for measuring distance to a highly reflective target within a large field of view. An aspect of this objective is to provide a solution for discriminating highly reflective targets better against the surrounding.

According to a first aspect, a housing for a Time-of-Flight (ToF) range meter is provided, comprising a wall structure defining an emitter beam path for an emitter of the ToF range meter, the emitter beam path having an output aperture; and a detector beam path to a detector of the ToF range meter, the detector beam path having an input aperture. The housing further comprises an emitter diffusor, arranged in the emitter beam path, spaced apart from said output aperture. An illuminated portion of the diffusor will thus act as a new light source, which is further shaped by the output aperture. By this construction, a housing for adapting a ToF range meter is accomplished, which is suitable for operation against small highly reflective targets.

In one embodiment, the wall structure defines an engagement interface to the ToF range meter, configured to position said emitter diffusor spaced apart from an emitter position of the ToF range meter.

In one embodiment, said wall structure comprises a wall member between an emitter opening and a detector opening, which wall member separates the emitter beam path from the detector beam path.

In one embodiment, the output aperture for the emitter beam path is arranged farther away from a plane of the detector than the input aperture to the detector beam path.

In one embodiment, the emitter diffusor is configured to shape light to obtain divergence, and wherein the emitter aperture is configured to screen a portion of light diverging from an illuminated portion of the emitter diffusor.

In one embodiment, the housing further comprises a detector diffusor arranged in the detector beam path.

In one embodiment, the detector diffusor is arranged at said input aperture.

According to a second aspect, a ToF ranging device is provided, comprising a ToF range meter including an emitter configured to emit light, and a detector configured to detect reflected light emitted by the emitter; and a housing according to any of the preceding embodiments, connected to the ToF range meter.

According to a third aspect, a measurement system for an exercise machine is provided, which exercise machine comprises a lifting mechanism and an engaging member for selectively engaging a number of stacked weights to the lifting mechanism, the measurement system comprising a pair of cooperating members including ToF ranging device of the preceding embodiment, and a reflector member, wherein one of the cooperating members is connected to the lifting mechanism and the other of the cooperating members is connected to the engaging member, wherein the ToF ranging device is directed to measure a distance to the reflector member to determine a distance which correlates to the weight of the selectively engaged weights.

Details, function, effects and benefits of various embodiments are outlined in the detail description and the appended drawings.

BRIEF DESCRIPTION OF THE DRAWINGS

Various embodiments are described below with reference to the accompanying drawings.

DETAILED DESCRIPTION OF EMBODIMENTS

Embodiments will now be described with reference to the drawings, wherein like reference numerals are used to refer to like elements throughout. To facilitate the discussion of any particular element, the most significant digit or digits of any reference number refer to the Figure in which that element is first introduced. It will be understood that the figures are not necessarily to scale. Also, features that are described and/or illustrated with respect to one embodiment may be used in the same way or in a similar way in one or more other embodiments and/or in combination with or instead of the features of the other embodiments. It may further be noted that reference signs for all elements are not included in every figure, but the same references numbers are consistently used to indicate the same or corresponding features.

Certain details are set forth in the following description and in the drawings to provide a thorough understanding of various embodiments of the present disclosure. Other details describing well-known structures and systems often associated with weight training machines, signal processing systems, and electronic display devices, however, are not set forth in the following disclosure to avoid unnecessarily obscuring the description of various embodiments. Many of the details, dimensions, and other features shown in the figures are merely illustrative of particular embodiments of the disclosure. Accordingly, other embodiments can have other details, dimensions, and features without departing from the scope of the present disclosure. In addition, further embodiments of the present disclosure can be practiced without several of the details described below.

An area of implementation of ToF range meters, investigated by the instant applicant, is training equipment in the form of exercise machines. A common type of weight machines makes use of gravity as the primary source of resistance. A combination of devices such as pulleys, levers, wheels, inclines, etc. are engaged to change the mechanical advantage of the overall machine relative to the weight and convey the resistance to the person using the machine. Conventional stacked weight machines typically include a stack of weight plates through which a lifting mechanism, e.g. comprising a vertical lifting bar, passes. The lifting bar may include a plurality of holes configured to accept an engaging member, such as a load pin. Each of the plates has a corresponding channel that aligns with one of the holes in the lifting bar when the lifting bar is in the lowered or at-rest position. To lift a selected number of the plates, the user operates the engaging member, e.g. by inserting a load pin through the channel and the corresponding hole in the lift bar at a selected weight level. As the user goes through the exercise motion, the lift bar is raised while the engaging member supports all of the plates stacked above it. The various settings on the weight machine allow the user to select from several different levels of resistance over the same range of motion by simply inserting the load pin into the lift bar at a desired weight level.

One important aspect of any type of exercise program is the ability to track personal performance and progress. For this purpose, an automated measurement system may be employed, configured to track weight and repetitions. An exercise machine may comprise a lifting mechanism and an engaging member for selectively engaging a number of stacked weights to the lifting mechanism, and may further be fitted with a measurement system comprising a pair of cooperating members including a range meter and a reflector member. One of the cooperating members may be connected to the lifting mechanism and the other of the cooperating members may be connected to the engaging member, wherein the range meter is directed to measure a distance to the reflector member to determine a distance which correlates to the weight of the selectively engaged weights. The range meter may include a ToF sensor.

In one setup of such a system, the range meter is attached to the lifting mechanism at the top of the weight stack, and rages towards the load pin. In the weight stack, each weight is generally a plate with a certain a thickness, which may be in the order of 9-25 mm. This can be seen as a minimum level of accuracy for proper distance determination, in order to correctly detect applied weight. However, various tests have shown that the overall accuracy is not sufficient. Instead of a drift of only a few millimetres, e.g. +/−3 mm, in a stable setup with a big white diffuse target, the drift over time with a small high reflectance target might be tens of mm, e.g. +/−25 mm. The result may be incorrect reading of distance, and thus weight.

The inventors have concluded that a reason for this drawback may be associated with the small size target of the load pin. However, an installation of a measurement system as described is typically made on an existing exercise machine design. In many of such designs, the handle of the load pin is rounded, e.g. cylindrical. Typically, the load pin is provided with a reflective tape or paint, so as to be properly detectable by the ToF range meter. One theory is that such a high reflectance target with a comparably small size, since only a small part of the load pin will create a detectable reflex back to the range meter, may give rise to interference effects in the optical path from the coherent laser source emitter 120 to a SPAD array-detector 130.

Based on the detected drift problems, the inventors have found that improved consistency and repeatability may be obtained by means of appropriate configuration of a housing construction for the ToF range meter. Various embodiments associated with such a housing will now de described with reference to the drawings.

Figure 2:
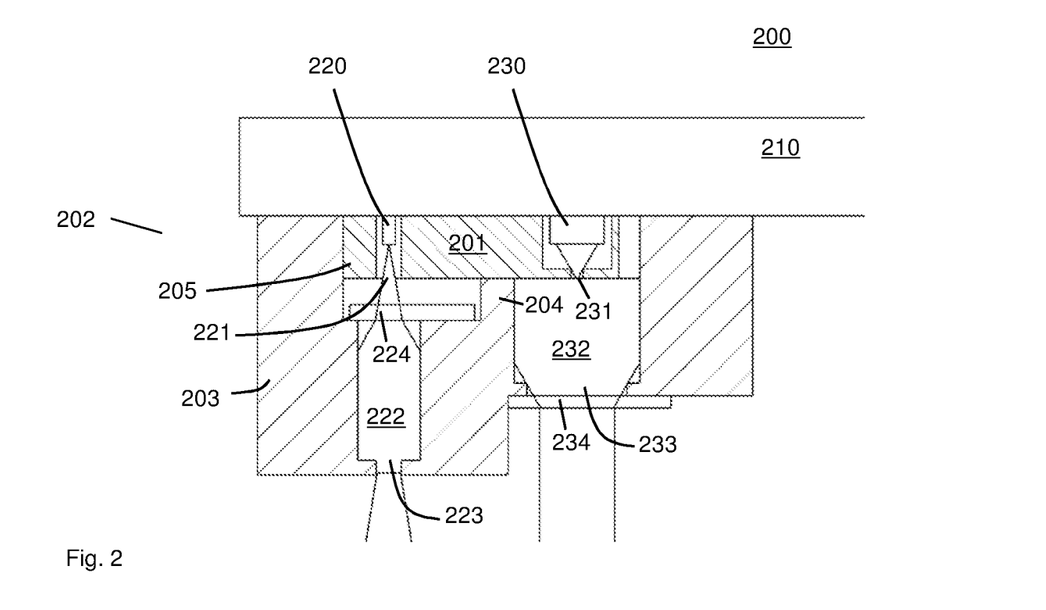
FIG. 2 shows a cross-sectional side view of a first embodiment of a housing for a ToF range meter.
Figure 3:
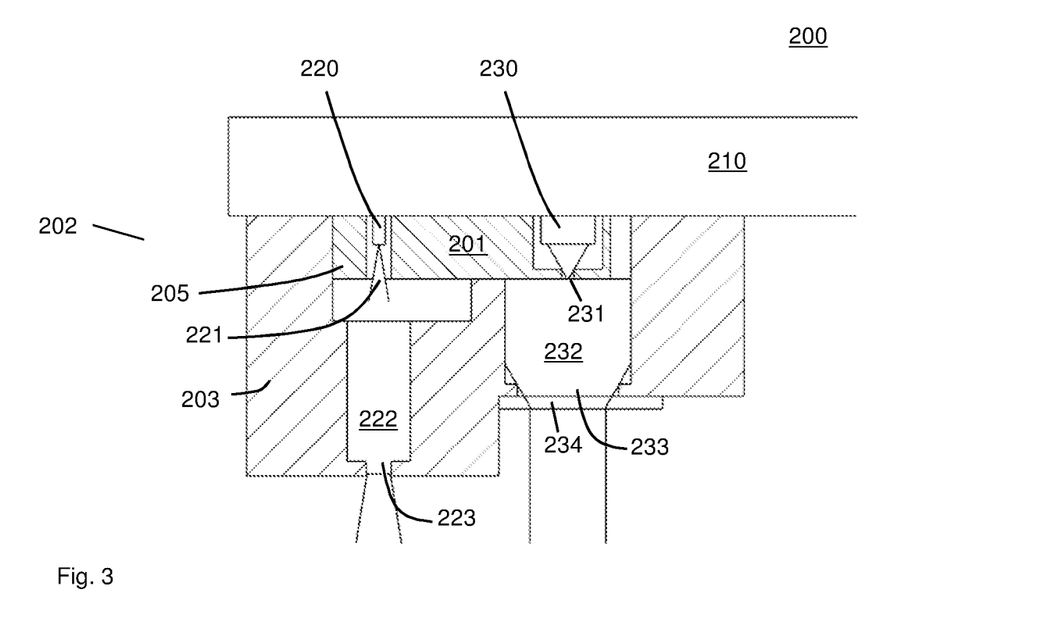
FIG. 3 shows a cross-sectional side view of a second embodiment of a housing for a ToF range meter.
Figure 4:
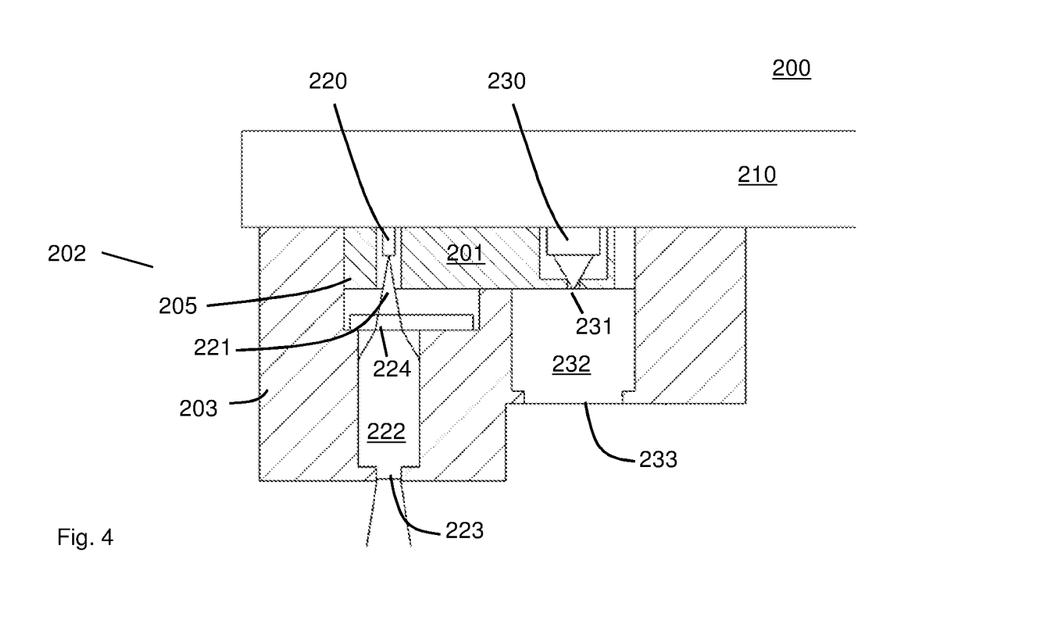
FIG. 4 shows a cross-sectional side view of a third embodiment of a housing for a ToF range meter.

FIGS. 2-4 schematically illustrate cross-sectional views of various embodiments, where a housing 202 is provided onto a ToF sensor or range meter 201, so as to collectively form a ToF ranging device 200. The ToF range meter 201 may e.g. be configured as described with reference to the range meter 100 of FIG. 1. As an example, the range meter may be a VL53L0 device, as provided by STMicroelectronics. The ToF range meter 201 may thus include an emitter 220 configured to emit electromagnetic radiation at one or more frequencies, and a detector 230 configured to detect electromagnetic radiation of at least one of the frequencies of the emitter 220. The emitter 220 and the detector 230 may be configured to operate at optical light frequencies, e.g. in the near infrared (NIR). The emitter may include a laser, or optionally a LED with a lens system. The emitter 220 and the detector 230 may be attached to a carrier member 210, such as a PCB, preferably such that the emitter 220 and the detector 230 have at least overlapping fields of view. Normally, the emitter 220 and the detector 230 are arranged with parallel optical axes. The ToF range meter 201 may include a casing 205, covering and housing the emitter 220 and the detector 230. An emitter opening 221 is associated with the emitter 220, such as an orifice in the casing 205 which allows the emitter 220 to emit light. In various embodiments, the orifice may define an aperture for the emitter of the ToF range meter 201, while in other embodiments the emitter aperture is defined by the light source of the emitter 220. A detector opening 231 is associated with the detector 230, such as an orifice in the casing 205 which allows the detector 230 to receive light. In various embodiments, the orifice may have a smaller cross-section than the surface of the detector 230.

The housing 202 may comprise a wall structure 203, which is provided around and over the ToF range meter 201, or a part of the ToF range meter 201. The wall structure 203 may define a first optical beam path 222 to the emitter 220 of the ToF range meter, serving as a channel for leading light from the emitter 220. In addition, a second optical beam path 232 to the detector 230 of the ToF range meter 201 may be configured by the wall structure 203, forming a channel for accepting light to the detector 230. Furthermore, a transmissive optical diffusor 224, 234 is comprised in the housing 202, configured to cover the beam path to at least one of said emitter 220 and said detector 230. In various embodiments (not shown), the wall structure may be configured to define a specific beam path to only one of the emitter 220 and the detector, whereas the beam path to the other of the emitter 220 and the detector 230 is defined by passing outside the housing 202. As an example, the housing 202 may include a channel provided about either the emitter 220 or about the detector 230.

Careful and repeated tests have shown that by arranging a diffusor 224, 234 in at least one of the optical paths 222, 232 of the emitter 220 and the detector 230, a distinct improvement has been detected in terms of consistency and stability to drift.

In various embodiments, the wall structure 203 of the housing 202 comprises a wall member 204 between the emitter opening and the detector opening, which wall member 204 separates first optical beam path from second optical beam path.

In various embodiments, such as shown in the drawings, the diffusor 224, 234 is suspended in the housing construction 202 such that it is arranged spaced apart from the at least one of said emitter 220 and detector 230. This way, the risk for reflections occurring at the interface or the surface of the diffusor 224, 234, which may cause optical leakage at an interface between the ToF range meter 201 and the housing 202, such as at the interface between the wall member 204 and a casing 205 of the ToF range meter, causing cross-talk between the emitter beam path 222 and the detector beam path 232, may be minimized.

The wall structure 203 may define an engagement interface to the emitter 220, including e.g. an end portion of the wall portion 204, which orients the wall structure 203 with respect to the range meter 201 by means of at least abutment. The emitter diffusor 224 is preferably arranged and suspended spaced apart from said engagement interface by a distance, such that a spacing D1 between the diffusor 224 to the emitter is obtained.

By suspending the diffusor 224, 234 at a distance from the openings 221, 231 to the emitter 220, and possibly the detector 230, respectively, tests have shown that it is possible to fit the housing 202 onto the ToF range meter 201 without the need for using any adhesive or sealing at the interface between the wall member 204 and the casing 205 of the range meter 201. Rather, a snug planar fitting at that interface is sufficient, which may be accomplished by snapping or sliding on the housing 202 onto the ToF range meter 201. A mechanism for attachment may e.g. be provided at the carrier 210 of the ToF range meter, such as guide rails or snap-on locks (not shown).

As illustrated in FIGS. 2-4, the housing 202 is arranged with a first aperture 223 to the first optical beam path 222, and a second aperture 233 to the second optical beam path 232, so as to allow light to pass from and to the ToF range meter 201. Furthermore, in various embodiments, the first aperture, i.e. the emitter aperture 223, may be arranged farther away from a plane of the detector 230 than the detector aperture 233. Tests have shown that by applying a protruding emitter aperture 223, compared to the detector aperture 233, unwanted reflections occurring in or near the emitter aperture 223, as e.g. caused by dust or other near objects, are less likely to be detected by the detector 230 of the ToF range meter 201 and cause cross-talk.

Figure 6:
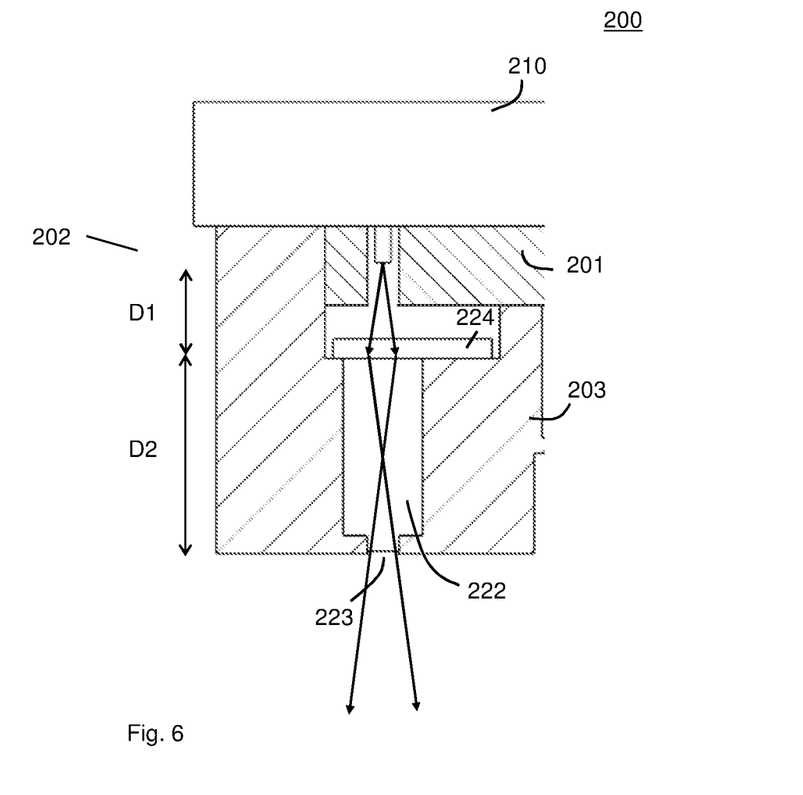
FIG. 6 schematically illustrates a portion of an embodiment of a housing for a ToF range meter in cross-section.

In various embodiment, such as shown in FIGS. 2, 4 and 6, the diffusor includes an emitter diffusor 224, arranged in the first optical beam path 222. Furthermore, in various embodiments, the emitter diffusor 224 is suspended in the housing 203 between the emitter 220 and the first aperture 223, preferably completely covering the first optical beam path 222. In various embodiments, as shown in the drawings, the emitter diffusor 224 is attached to a rim or lip facing the emitter 220, such as to an outer surface of the wall structure 203. As indicated with reference to FIG. 4, the housing may be provided only with an emitter diffusor 224 and no detector diffusor.

In various embodiments, the output aperture 223 for the emitter light may be covered by a cover element, such as a glass or plastic film or piece which is transmissive to at least the wavelength of the intended ToF range meter 201. Preferably, the transmissive element is non-refractive.

In various embodiments, such as shown in FIGS. 2 and 3, the diffusor includes a detector diffusor 234, arranged in the second optical beam path 232. The detector diffusor 234 is preferably arranged at the second aperture 233, which is spaced apart from the detector 230. This way, received light, which is substantially collimated when measurement is made towards a small target surface 161, may be collected from each point of the surface of the detector diffusor 234. The detector diffusor 234 is preferably substantially wider, i.e. has a larger cross-section area, than the detector opening 231. In various embodiments, as shown in the drawings, the detector diffusor 234 may be attached to a rim or lip facing away from the detector 230, such as to an outer surface of the wall structure 203. As indicated with reference to FIG. 3, the housing 202 may be provided only with a detector diffusor 234 and no emitter diffusor.

While improvements have been detected with respect to drift of ToF measurement results with embodiments realized as indicated in FIGS. 3 and 4, further improved stability in range measurements has been detected with the combined use of an emitter diffusor 224 and a detector diffusor 234, as shown in FIG. 2. In various embodiments, as described with reference the drawings of FIGS. 2-4, the housing 202 may be devised as a mechanical add-on component, e.g. an opaque plastic device, with one or more diffusors. In other embodiments, a ToF ranging device 200 may be designed as a combined unit, where the housing is configured to act as a casing for the emitter 220 and the detector 230, possibly without any inner casing corresponding to casing 205. In this context, opaque refers to an operating wavelength of the emitter 220 and the detector 230, such as NIR.

In various embodiments, one function of the diffusor or diffusors 224, 234 is to disturb or destroy the coherence of the emitter 220 and reduce the interference problem in the optical system. This is particularly relevant when the emitter 220 includes a laser source. A technical effect obtained by means of the disclosed embodiments is that the detector 230, such as a SPAD detector array, is fully illuminated by the incoming beam, and that interference is minimized or completely suppressed. The function of the TOF-component itself is not changed, it is only the light characteristics, such as coherence, beam width and beam angle, between the laser and the detector-array which will be influenced by the add on optics.

Referring again to the exemplary embodiment of FIG. 2, and also to FIGS. 5 and 6, the light path through the optical system will now be explained, for a ToF ranging device 200, comprising a ToF range meter 201 provided with a housing 202.

The emitter 220 of the ToF range meter may typically include one or more semiconductor lasers, configured to emit coherent light in a diverging beam out through the emitter opening 221 in the casing 205 of the ToF range meter. The emitter 220 may comprise a Vertical-Cavity Surface-Emitting Laser (VCSEL). The output divergence of the emitter 220 may by the geometry of such laser or lasers, such as the geometry of an aperture of each laser, of the emitter 220 and is not restricted by the output opening 221.

The light hits the emitter diffusor 224 disposed just outside the package ToF range meter, but preferably spaced apart a distance from an outer surface of the casing 205. The emitter diffuser 224 spreads the light in a controlled way. The illuminated portion of the emitter diffusor 224 spot can be regarded as a new light source with larger diameter and with less coherence, since the light is scrambled in the diffusor 224. The size of this light source can be controlled by design or at assembly, by selecting the distance D1 between the diffusor 224 and the emitter 220 laser source, see FIG. 5. The divergence and the scrambling of the light is controlled by the strength of the diffusor.

Light from the emitter diffusor 224 reaches and passes through the comparatively small aperture 223 at the top of the housing 202. Referring to FIG. 6, which only displays the emitter portion of the housing 202 and the ToF range meter 201, the diameter of the hole of the aperture 223 and the distance D2 between the emitter diffusor 224 and the aperture 223 controls the divergence of the output beam from the plastic housing. This way, the emitter aperture 223 is configured to screen a portion of light diverging from an illuminated portion of the emitter diffusor 224. In various embodiments, the housing may be configured such that the distance D2, the size of the aperture and the strength of the diffusor results in a major portion of the emitted light being screened. In various embodiments the housing may thus be configured such that only 80% of the light from the emitter of an attached range meter passes through the aperture 223, or less than 50%, or even less than 20%.

Emitted light hits a target, such as a small reflective target. In various embodiments, the reflective target may be selected to act as a target, such as a load pin of an exercise machine, and the reflective target may be built up by many small retroreflectors, provided e.g. by means of a reflective tape. Some of the light will be reflected back towards the ToF ranging device 200 from the target.

A small amount of the light is reflected back to hit the detector diffusor 234. The light is almost parallel since the distance from the reflective target to the TOF sensor is normally very large compared to the reflective surface size. The detector diffusor 234 will spread the light to fully illuminate the sensor-array through the pinhole opening 231 in the casing 205 of the ToF range meter 201.

Light passes through the entrance pinhole opening 231 and onto the ToF detector 230, to light up the entire array of sensors (SPADS) of the detector 230.

ToF range meter electronics, corresponding to 140 in FIG. 1, proceeds to calculate the distance to the target by measuring the time of flight for the optical path.

The size of the aperture restrictions and the distance between the diffusors 224 and/or 234 and the ToF range meter 201, in combination with the diffusor strength of the two diffusors will set the performance of the system.

Figure 5:
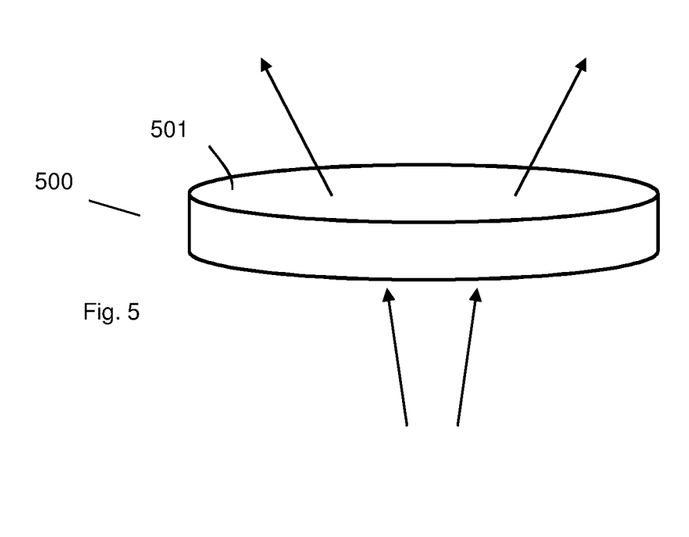
FIG. 5 shows schematic view of an optical transmissive diffusor as implemented in various embodiments.

FIG. 5 schematically illustrates a diffusor 500, usable as an emitter diffusor 224 or a detector diffusor 234 in various embodiments. The diffusor 500 has at least one surface 501 configured to provide a desired light shaping effect to an incoming light beam. One example of a usable diffusor type, which has been tested with beneficial results in a ToF ranging device 200 according to the embodiments disclosed herein, is LSD® Light Shaping Diffuser sheet, as marketed by Luminit, which provide a transmission efficiency exceeding 90% at NIR by holographic beam shaping. The exemplary diffusor 500 of FIG. 5 may be configured to provide a 30 degree cone angle from collimated light, and will generate divergence also for already divergent light, such as from a VCSEL of an emitter 220. The emitter diffusor 224 is preferably selected to be configured to shape light into a predetermined cone angle suitable for the geometry of the housing 202. Referring to FIG. 6, the illuminated portion of the emitter diffusor 224 may act as a new light source or emitter. Due to the beam shaping inflicted by the diffusor 224 on the beam from the emitter 220, a substantially greater divergence than what is allowed through the aperture 223 is obtained. The aperture 223 will thus admit emission of only a portion of the light from the diffusor 224. As indicated by the crossing rays in FIG. 6, the emitter diffusor is configured to shape light to obtain divergence, and by arranging the emitter diffusor at a distance D2 from the first aperture, only a portion of the diverging light from an illuminated portion of the emitter diffusor is emitted from first aperture.

Even though the housing 202 has been illustrated in the drawings in connection with a ToF range meter 201, it should be understood that the housing 202 may be provided as a separate device 202, suited for post assembly with a ToF range meter 201.

In an alternative embodiment, a ToF ranging device 200 may be provided, comprising a ToF range meter 201 including an emitter 220 configured to emit light, and a detector 230 configured to detect reflected light emitted by the emitter, and where a housing 202 as disclosed herein is arranged to the ToF range meter 201, and possibly attached to the ToF range meter 201.

In one embodiment, a measurement system for an exercise machine is provided, as will be described with reference to FIGS. 7A to 7D. The measurement system includes a ToF ranging device 200 as described herein, i.e. a ToF range meter provided with a housing 202 according to any one of the described embodiments.

Figure 7A:
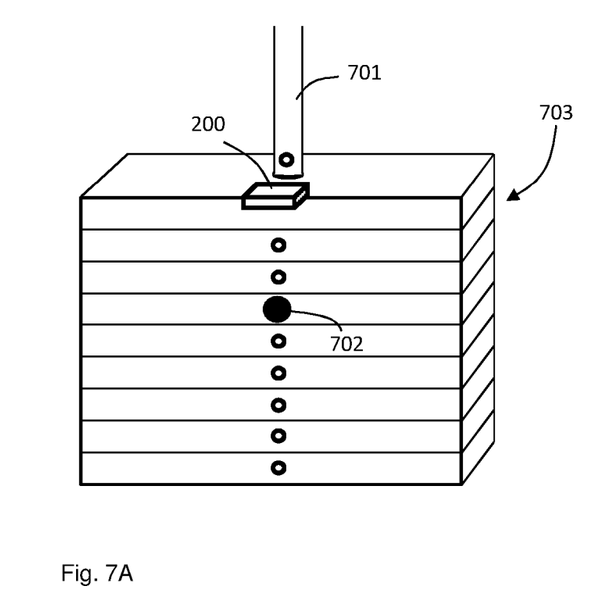
FIG. 7A is a view of a part of an exercise machine having weight plates and a load pin, configured with a measurement system according to an embodiment.
Figure 7B:
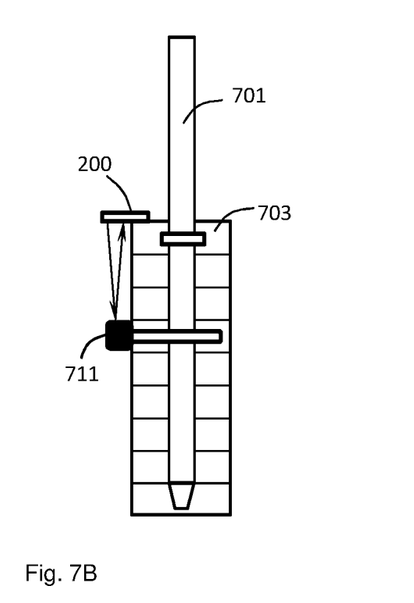
FIG. 7B is a cross-sectional side view of the parts shown in FIG. 7A.
Figures 7C, 7D:
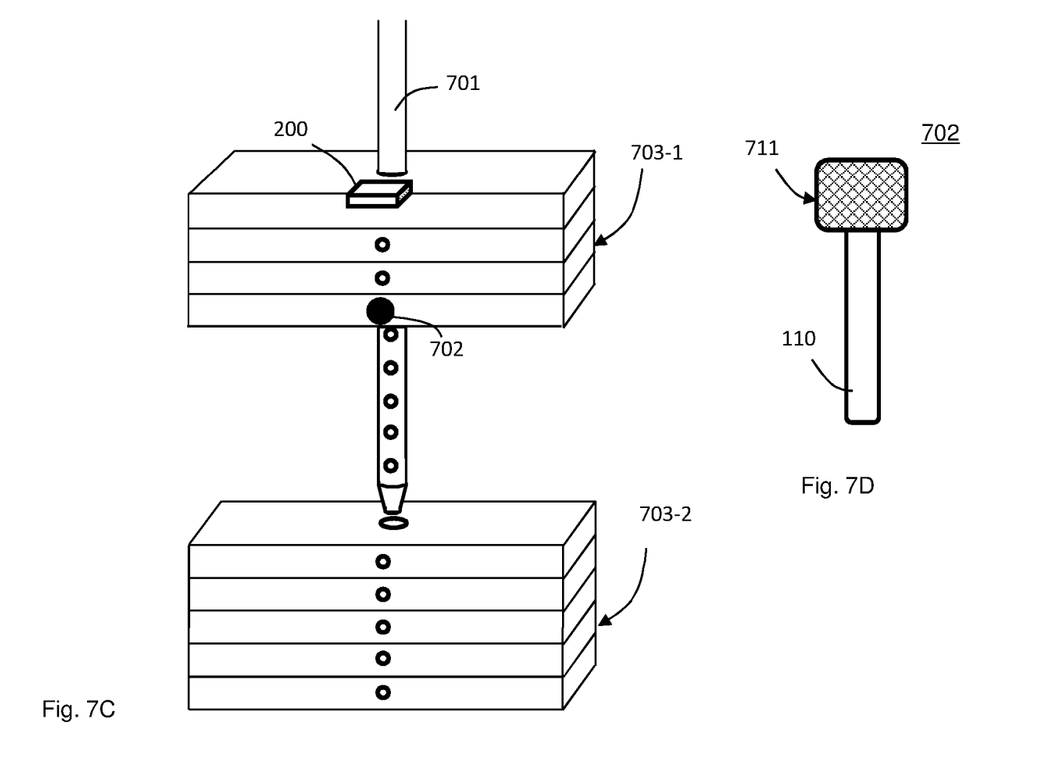
FIG. 7C illustrates the parts of FIG. 7A, in operation of the exercise machine.
FIG. 7D shows an engaging member in the form of a load pin, according to a system embodiment.

FIGS. 7A-7D show various views of a part of an exercise machine, comprising a lifting mechanism 701 and an engaging member 702 for selectively engaging a number of stacked weights 703 to the lifting mechanism. FIGS. 7A and 7C illustrate perspective views, whereas FIG. B schematically illustrate a vertical cross-section through the weight stack 703, the lifting mechanism 701 and the engaging member 702. In the illustrated embodiment, the lifting mechanism 701 includes a support member having a rod-shaped portion, configured to pass vertically through corresponding holes in the weights 703. The support member of the lifting mechanism 701 may furthermore include a top portion, such as a fixed top weight 703.

The measurement system may comprise a pair of cooperating members including a ToF ranging device 200 and a reflector member 711. One of the cooperating members is connected to the lifting mechanism 701 and the other of the cooperating members is connected to the engaging member 702. The ToF ranging device 200 is directed to measure a distance to the reflector member 711 to determine a distance which correlates to the weight of the selectively engaged weights. In the illustrated embodiments, the ToF ranging device 200 is fixed to the lifting mechanism 701 and the reflector member 711 is connected to the engaging member 702. The following description will be directed to this type of embodiment, but as will be readily understood by the skilled reader, the opposite arrangement may be employed in various embodiments, i.e. with the ToF ranging device 200 connected to the engaging member 702 and the reflector member being connected to the lifting mechanism 701.

FIG. 7D schematically illustrates an engaging member 702 in the form of a load pin 702, having a handle or knob to which the reflector member 711 is connected. In one embodiment, the reflector member 711 may be a reflective surface 711, such as a reflective tape attached about a perimeter of the handle. In an alternative embodiment, the reflector member may comprise a paint or surface structure, configured to be diffusively or specularly reflective to electromagnetic radiation of at least the wavelength range within which a ToF ranging device 200 operates.

As can be seen in FIGS. 7A-7C, the ToF ranging device 200 is preferably connected to the lifting mechanism 701 vertically above the weight stack 703 and directed to carry out distance measurement downwards towards the engaging member 702. Different embodiments may include different types of ToF ranging devices 200. In various embodiments, the ToF ranging device 200 operates by emitting a signal towards the reflector member and detecting a reflection of the emitted signal. The ToF ranging device 200 is preferably configured to carry out signal processing to determine the distance to the point of reflection, based on at least the detected received signal.

The ToF ranging device 200 is preferably placed on top of the weight plates 703, e.g. connected thereto by means of screws, an adhesive, clamps, magnet or other fastening means. The ToF ranging device 200 may be fastened to the rod portion, to the uppermost weight, or other part of the lifting mechanism 701. The ToF ranging device, e.g. a time of flight sensor 200, is configured to measure the distance to the pin 702, more particularly to the reflector member 711 on the pin 702. A benefit of using a time of flight sensor is the small packaging and high precision in available products, such as e.g. the VL53L0 from STMicroelectronics. In addition, by placing the ToF ranging device immediately on top of the weight stack 703, and measuring the comparatively short distance to the engaging member 702, the maximum distance will in most gym machines never exceed 1 meter, or even a maximum distance of 50 cm. This makes it possible to employ ToF ranging devices adapted for measurement of comparatively short distances, thereby minimising power consumption. Furthermore, since the ToF ranging device is placed vertically over the reflector member 711, movement of the engaging member 702 to select a different weight setting will still entail displacement of the reflector member along the line of sight of the ToF ranging device. By fixedly attaching the ToF ranging device to the lifting mechanism, movement of the engaging member 702 will not lead to any change in position or direction of the emitter and receiver field of view. This means that a more reliable and less complex system can be obtained, than with a system employing an active sender or received in the movable load pin 702, especially since most weight pins are freely rotatable.

In various embodiments, an operation detection mechanism is communicatively connected to trigger the ToF ranging device 200 to make a distance measurement responsive to detection of operation of the exercise machine. Operation detection mechanism may be e.g. provided by a motion sensor, which may be separate or be integrated with the ToF ranging device 200. In one embodiment, the distance measurement is carried out dependent on detection of movement of the weight stack 703. More particularly, the ToF ranging device 200 may be configured to carry out a new distance measurement at a point in time triggered by detection of movement of the weight stack 703. As an alternative, the ToF ranging device 200 may be configured to carry out a new distance measurement at a point in time triggered by detection of operation of the engaging member 702, e.g. as reported by a motion detector or proximity sensor. Preferably, the ToF ranging device 200 is held in sleep mode until the motion sensor or sensors detect absolution motion, i.e. by when movement of the engaging member 702 is sensed by sensed motion or proximity sensor, when movement of the weight stack is sensed, or when both criteria are fulfilled as outlined above. The measured distance to the reflector 711 on the engaging member 702 is converted into a weight measurement, e.g. in a server at the gym or in the cloud, or locally in the ToF ranging device control unit 200, or in an app of a user device such as a mobile phone, a wristlet or similar, associated with a user of the exercise machine. Distance or weight data may be wirelessly transmitted to the user device, directly from a transmitter at the exercise machine, or through a communication network.

An overall benefit of the proposed measurement system is that it is easy to install, also in an already deployed gym environment. A system based on e.g. a time of flight meter is very robust, and particularly where configured to be awaken from sleep mode by a motion detector, it drains very little power and devices required to build the system carry low cost.

The invention claimed is:

1. A housing for a Time-of-Flight (ToF) range meter, comprising
a wall structure defining:
an emitter beam path for an emitter of the ToF range meter, the emitter beam path having an output aperture;
a detector beam path to a detector of the ToF range meter, the detector beam path having an input aperture; and
an emitter diffusor, arranged in the emitter beam path, spaced apart from said output aperture by a distance, such that said distance and a diameter of the output aperture determines output divergence of light passing through the emitter beam path, and wherein at least 20% of the light diverging from an illuminated portion of the emitter diffusor is screened off by the output aperture.

2. The housing of claim 1, wherein the wall structure defines an engagement interface to the ToF range meter, configured to position said emitter diffusor spaced apart from an emitter position of the ToF range meter.

3. The housing of claim 1, wherein said wall structure comprises a wall member between an emitter opening and a detector opening, which wall member separates the emitter beam path from the detector beam path.

4. The housing of claim 1, wherein the output aperture for the emitter beam path is arranged farther away from a plane of the detector than the input aperture to the detector beam path.

5. The housing of claim 1, wherein the emitter diffusor is configured to destroy or disturb coherence of light and to shape light to obtain divergence.

6. The housing of claim 1, further comprising a detector diffusor arranged in the detector beam path.

7. The housing of claim 6, wherein the detector diffusor is arranged at said input aperture.

8. A Time-of-Flight (ToF) ranging device, comprising
a ToF range meter including:
an emitter configured to emit light, and
a detector configured to detect reflected light emitted by the emitter; and
a housing connected to the ToF range meter, said housing comprising
a wall structure defining:
an emitter beam path for said emitter, the emitter beam path having an output aperture;
a detector beam path to said detector, the detector beam path having an input aperture; and
an emitter diffusor, arranged in the emitter beam path, spaced apart from said output aperture by a distance, such that said distance and a diameter of the output aperture determines output divergence of light passing through the emitter beam path, and wherein at least 20% of the light diverging from an illuminated portion of the emitter diffusor is screened off by the output aperture.

9. The ToF ranging device of claim 8, wherein said emitter is a laser, wherein coherence in the light emitted from the emitter is destroyed or disturbed in said emitter diffuser.

10. The ToF ranging device of claim 8, wherein the illuminated portion of the diffuser acts as a new light source with less coherence than light emitted from said emitter.

11. The ToF ranging device of claim 8, wherein at least 50% of light diverging from the illuminated portion of the diffuser is screen off by said output aperture.

12. The ToF ranging device of claim 8, wherein the output aperture for the emitter beam path is arranged farther away from a plane of the detector than the input aperture to the detector beam path.

13. A measurement system for an exercise machine, which exercise machine comprises a lifting mechanism and an engaging member for selectively engaging a number of stacked weights to the lifting mechanism, the measurement system comprising a pair of cooperating members including
a Time-of-Flight (ToF) ranging device, and
a reflector member,
wherein the ToF ranging device comprises:
an emitter configured to emit light;
a detector configured to detect reflected light emitted by the emitter; and
a housing connected to the ToF range meter, said housing comprising
a wall structure defining:
an emitter beam path for said emitter, the emitter beam path having an output aperture;
a detector beam path to said detector, the detector beam path having an input aperture; and
an emitter diffusor, arranged in the emitter beam path, spaced apart from said output aperture by a distance, such that said distance and a diameter of the output aperture determines output divergence of light passing through the emitter beam path, and wherein at least 20% of the light diverging from an illuminated portion of the emitter diffusor is screened off by the output aperture;
wherein one of the cooperating members is connected to the lifting mechanism and the other of the cooperating members is connected to the engaging member, wherein the ToF ranging device is directed to measure a distance to the reflector member to determine a distance which correlates to the weight of the selectively engaged weights.

14. The measurement system of claim 13, wherein said emitter is a laser, wherein coherence in the light emitted from the emitter is destroyed or disturbed in said emitter diffuser.

15. The measurement system of claim 13, wherein the illuminated portion of the diffuser acts as a new light source with less coherence than light emitted from said emitter.

16. The measurement system of claim 13, wherein at least 50% of light diverging from the illuminated portion of the diffuser is screen off by said output aperture.

17. The measurement system of claim 13, wherein the output aperture for the emitter beam path is arranged farther away from a plane of the detector than the input aperture to the detector beam path.

* * * * *